United States Patent
Brewer

[11] Patent Number: 5,855,388
[45] Date of Patent: Jan. 5, 1999

[54] FLOATING GAUGE MOUNT FOR MOTORCYCLE

[75] Inventor: Thomas A. Brewer, Anderson, Ind.

[73] Assignee: Bastin-Logan Water Services, Inc., Franklin, Ind.

[21] Appl. No.: 588,339

[22] Filed: Jan. 18, 1996

[51] Int. Cl.⁶ .................................................. B62K 21/02
[52] U.S. Cl. ...................... 280/288.4; 280/276; 280/279; 224/424; 248/904
[58] Field of Search .................................. 280/275, 276, 280/279, 280, 277, 283, 288.4; 248/904, 27.1; 224/413, 424, 447, 450; 16/237

[56] References Cited

U.S. PATENT DOCUMENTS

| | | | |
|---|---|---|---|
| D. 303,057 | 8/1989 | Smith ........................................ | D7/70 |
| 1,121,580 | 12/1914 | Burkett et al. ........................... | 224/450 |
| 1,198,186 | 9/1916 | Brown ...................................... | 248/904 |
| 1,451,521 | 4/1923 | Wood ....................................... | 280/279 |
| 1,527,133 | 2/1925 | Harley . | |
| 2,267,583 | 12/1941 | Carroll .................................... | 248/904 |
| 2,504,452 | 4/1950 | Rostan . | |
| 2,541,535 | 2/1951 | Neff ........................................ | 248/904 |
| 2,755,053 | 7/1956 | Sloane ..................................... | 248/904 |
| 2,768,836 | 10/1956 | Hilber . | |
| 2,909,351 | 10/1959 | Pratt ....................................... | 248/904 |
| 2,991,969 | 7/1961 | Hubbard ................................. | 248/904 |
| 3,051,426 | 8/1962 | Wagner . | |
| 3,442,478 | 5/1969 | Parapetti ................................ | 248/904 |
| 3,908,226 | 9/1975 | Read et al. .............................. | 16/237 |
| 3,989,261 | 11/1976 | Kawaguchi . | |
| 4,032,168 | 6/1977 | Emerson ................................ | 280/279 |
| 4,436,350 | 3/1984 | Jolin ....................................... | 224/413 |
| 4,511,072 | 4/1985 | Owens ................................... | 224/273 |
| 4,721,179 | 1/1988 | Yamaguchi et al. . | |
| 4,723,621 | 2/1988 | Kawano et al. . | |
| 4,775,163 | 10/1988 | McGowan et al. . | |
| 4,828,069 | 5/1989 | Hatsuyama . | |
| 4,869,120 | 9/1989 | Kashiwai et al. . | |
| 4,984,722 | 1/1991 | Moore ................................... | 248/311.2 |
| 5,005,661 | 4/1991 | Taylor et al. ........................... | 224/413 |
| 5,026,083 | 6/1991 | Wendorf . | |
| 5,072,909 | 12/1991 | Huang ................................... | 248/311.2 |
| 5,148,327 | 9/1992 | Gaxiola Jr. ............................ | 280/288.4 |
| 5,186,274 | 2/1993 | Hegman . | |
| 5,413,007 | 5/1995 | Vernon .................................. | 73/866.3 |

FOREIGN PATENT DOCUMENTS

| | | | |
|---|---|---|---|
| 596488 | 7/1959 | Italy ...................................... | 280/276 |
| 65579 | 4/1950 | Netherlands .......................... | 280/276 |
| 190020 | 3/1937 | Switzerland .......................... | 280/281 |
| 634300 | 3/1950 | United Kingdom .................. | 280/276 |

OTHER PUBLICATIONS

*Big Twin*, Winter 1995, Cover Page and pp. 76–77.
1995 Harley–Davison® Genuine™ Parts and Accessories Catalog, pp. 47, 50 and 106.
Remus, Tim, A Sleeker Springer Making Good Look Better, *American Iron Magazine*, p. 13 May, 1994.
Harley–Davidson® 1994 Motorcycles Catalog, two pages.

*Primary Examiner*—Brian L. Johnson
*Assistant Examiner*—Gary Savitt
*Attorney, Agent, or Firm*—Barnes & Thornburg

[57] ABSTRACT

A springer fork assembly is provided for use on a motorcycle having handlebars. The springer fork assembly includes a springer fork and a gauge mount. The springer fork includes a non-moving portion that does not move relative to the handlebars and a moving portion that moves relative to the handlebars. The gauge mount is coupled to the moving portion of the springer fork for movement relative to the handlebars.

47 Claims, 6 Drawing Sheets

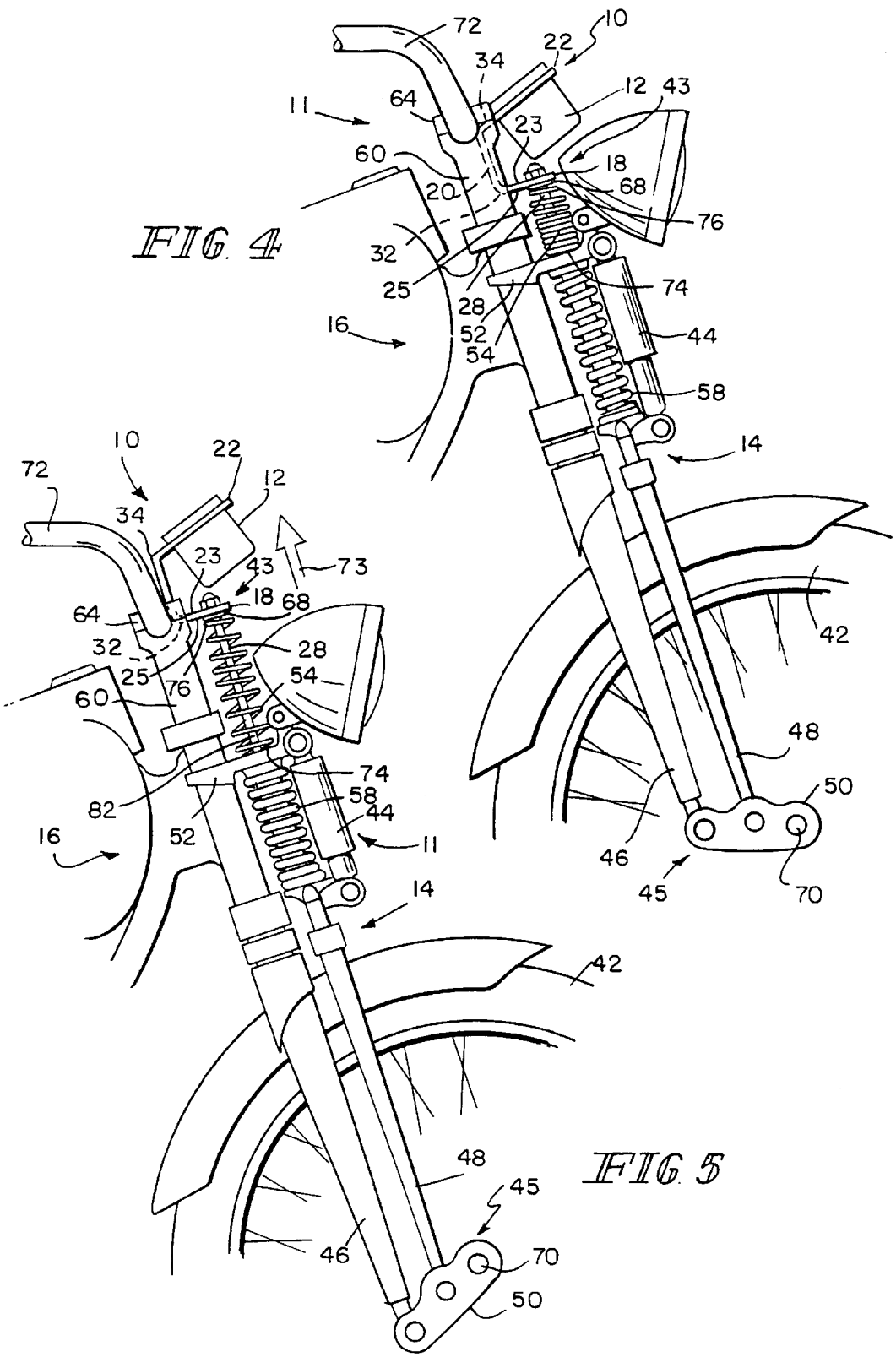

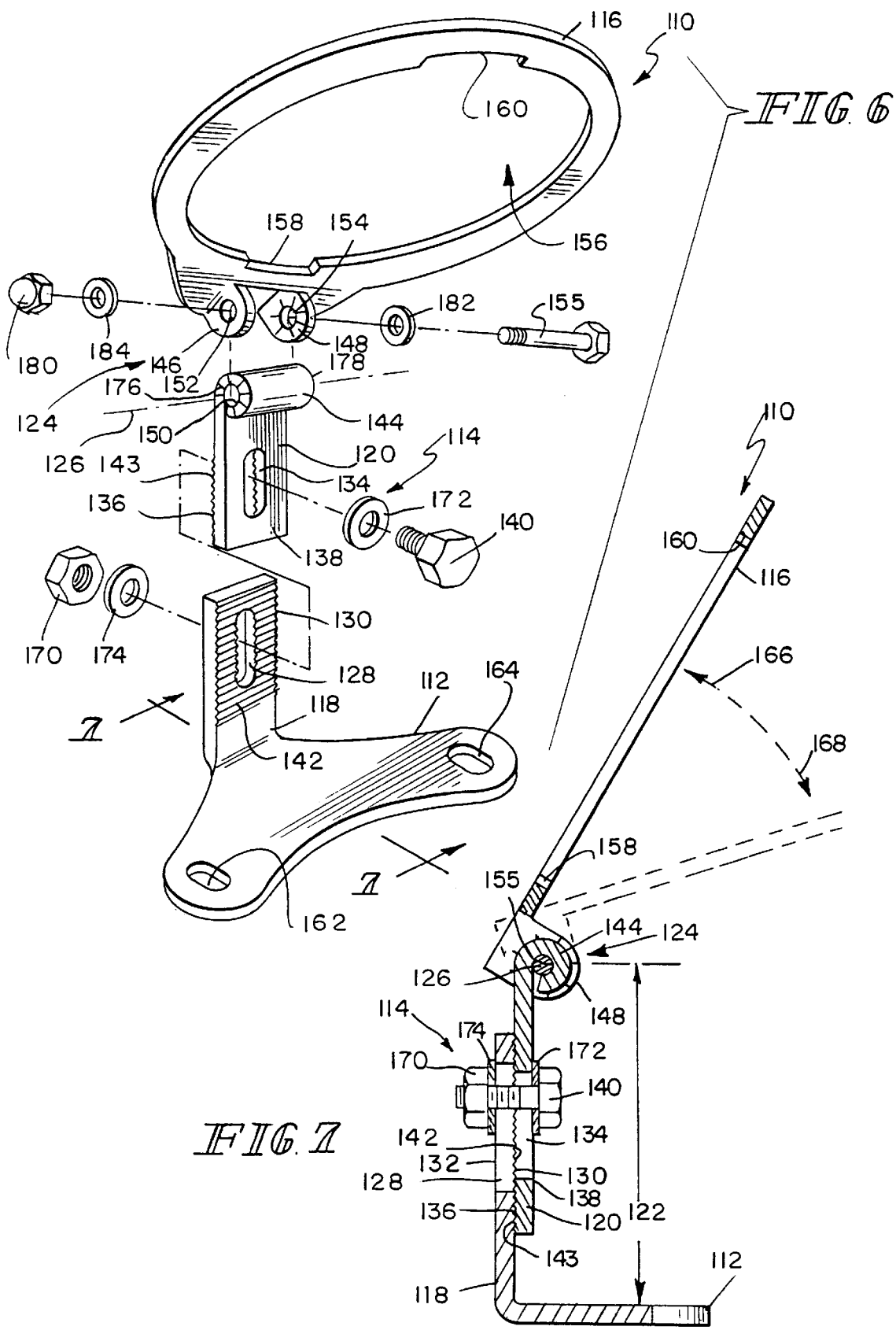

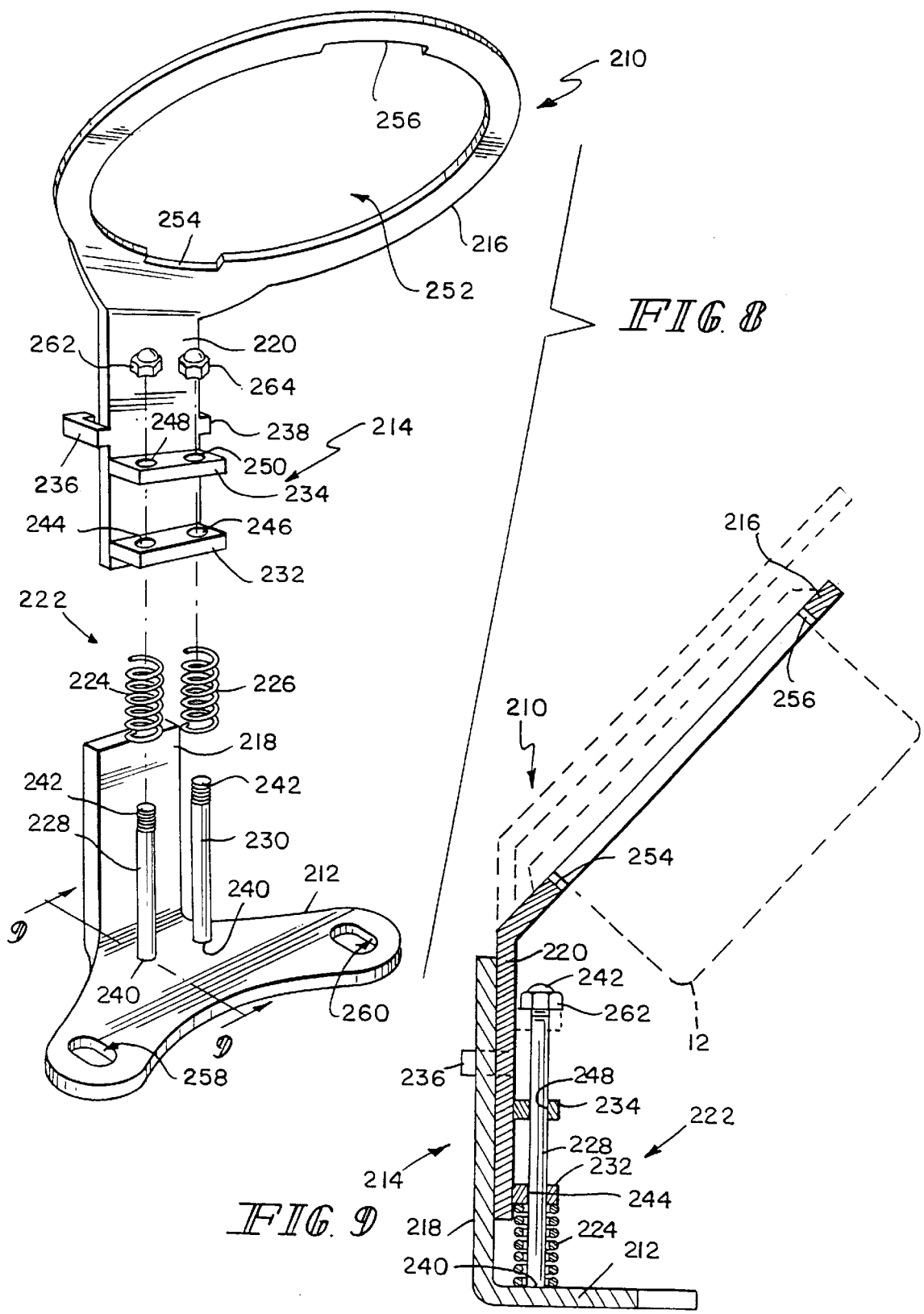

FLOATING GAUGE MOUNT FOR MOTORCYCLE

The present invention relates to gauge mounts, and in particular to gauge mounts for motorcycles or other vehicles. More particularly, the present invention relates to gauge mounts that mount on a springer fork of a motorcycle.

Everyone has seen gauges mounted on motorcycles and other objects. Gauges are used to inform the motorcycle user about a variety of information such as the speed of the motorcycle (speedometer), motorcycle engine speed (tachometer), oil pressure (pressure gauge), temperature (temperature gauge), etc. Gauge mounts are used to mount the gauges on the motorcycle in a position so that the user can see and use the gauges. Typically, the gauges are mounted adjacent to the handlebars of the motorcycle in a position where the user can see the gauges.

Springer forks are mounted between the front wheel and frame of the motorcycle to provide an additional suspension system to dampen the impact felt by the motorcycle user, for example, when the motorcycle drives over a bump or pothole in a road. When the motorcycle drives over a bump or pothole, the springer fork extends from its at-rest position upwardly between the handlebars of the motorcycle to its extended position where the gauges are typically located. The position of the gauges and gauge mounts are often dictated by the extended position of the springer fork so that the gauge is not damaged by the springer fork.

What is needed is a gauge mount mounted to a springer fork of a motorcycle. A gauge mount that is mounted to the springer fork would not be damaged due to movement of the springer fork. Such a gauge mount would be welcomed by consumers.

According to the present invention, a gauge mount includes a springer fork-mounting portion configured to mount to the springer fork of a motorcycle and a gauge mounting-portion configured to support a gauge. By attaching the springer fork-mounting portion of the gauge mount to the springer fork, a gauge situated in the gauge-mounting portion is permitted to travel with the springer fork relative to the rest of the motorcycle as it moves between its at-rest position and its extended position. Thus, the gauge is unlikely to be damaged by movement of the springer fork relative to the rest of the motorcycle.

Mounting the gauge mount to the springer fork also permits the gauge to be situated in an aesthetically pleasing location because the movement of the springer fork does not dictate the location of the gauge and gauge mount. The gauge can be situated in a location that is more attractive and easier to use by the motorcycle user.

In a preferred embodiment of the present invention, the gauge mount further includes a neck extending between the springer fork-mounting portion and the gauge-mounting portion. In another preferred embodiment, the neck includes a first neck section connected to the springer fork-mounting portion and a second neck section connected to the gauge-mounting portion. The first neck section is movable relative to the second neck section so that a motorcycle user can adjust the distance between the springer fork-mounting portion and the gauge-mounting portion.

In another preferred embodiment, the gauge mount includes a hinge connection between the neck and the gauge-mounting portion so that a motorcycle user can rotate the gauge-mounting portion about a hinge axis of rotation relative to the neck and springer fork-mounting portion. Rotating the gauge-mounting portion in this manner permits the motorcycle user to adjust the gauge-mounting portion to position the gauge in a desired location.

In yet another preferred embodiment of the present invention, the gauge mount includes a suspension system to dampen impacts felt by the gauge when the motorcycle drives over bumps or potholes in the road. Many gauges are sensitive to such impacts and thus such impacts can impair the performance of the gauges. The suspension system dampens the impacts felt by the gauge mounted in the gauge mount so that the performance of the gauge is not impaired.

Additional objects, features, and advantages of the invention will become apparent to those skilled in the art upon consideration of the following detailed description of preferred embodiments exemplifying the best mode of carrying out the invention as presently perceived.

BRIEF DESCRIPTION OF THE DRAWINGS

The detailed description particularly refers to the accompanying figures in which:

FIG. 4 is a side elevational view of the gauge mount of FIG. 1 mounted on the springer fork showing the gauge mounted in the gauge mount and the location of the gauge when the springer fork is in an at-rest position;

FIG. 5 is a side elevational view similar to FIG. 4 showing the location of the gauge when the motorcycle has driven over a bump or pothole in the road causing the springer fork, gauge mount, and gauge to extend upwardly in a direction toward the handlebars;

FIG. 6 is a perspective exploded view of another preferred embodiment of the present invention showing a gauge mount including a springer fork-mounting portion, a gauge-mounting portion, a neck having a first neck section appended to the springer fork-mounting portion and a second neck section appended to the gauge-mounting portion and movable relative to the first section, and a hinge connection between the second neck section and the gauge-mounting portion so that the gauge-mounting portion may rotate about a hinge axis of rotation relative to the neck and springer fork-mounting portion;

FIG. 7 is a sectional view taken along line 7—7 of FIG. 6 showing the gauge-mounting portion rotating about the hinge axis of rotation relative to the neck and springer fork-mounting portion when a motorcycle user wants to adjust the position of the gauge;

FIG. 8 is a perspective exploded view of yet another preferred embodiment of the present invention showing a gauge mount including a springer fork-mounting portion, a gauge-mounting portion, a neck including a first neck section appended to the spring fork-mounting portion and a second neck section appended to the gauge-mounting portion, and a suspension system including spaced-apart first and second springs, the springs extending between the springer fork-mounting portion and the second neck section and act to dampen impacts to a gauge mounted in the gauge-mounting portion;

FIG. 9 is a sectional view taken along line 9—9 of FIG. 8 showing a gauge (phantom lines) mounted in the gauge-mounting portion and the position of the gauge when the gauge mount experiences an impact (solid lines) and when the gauge mount is in the at-rest position (phantom lines)

DETAILED DESCRIPTION OF THE DRAWINGS

Figure 1:
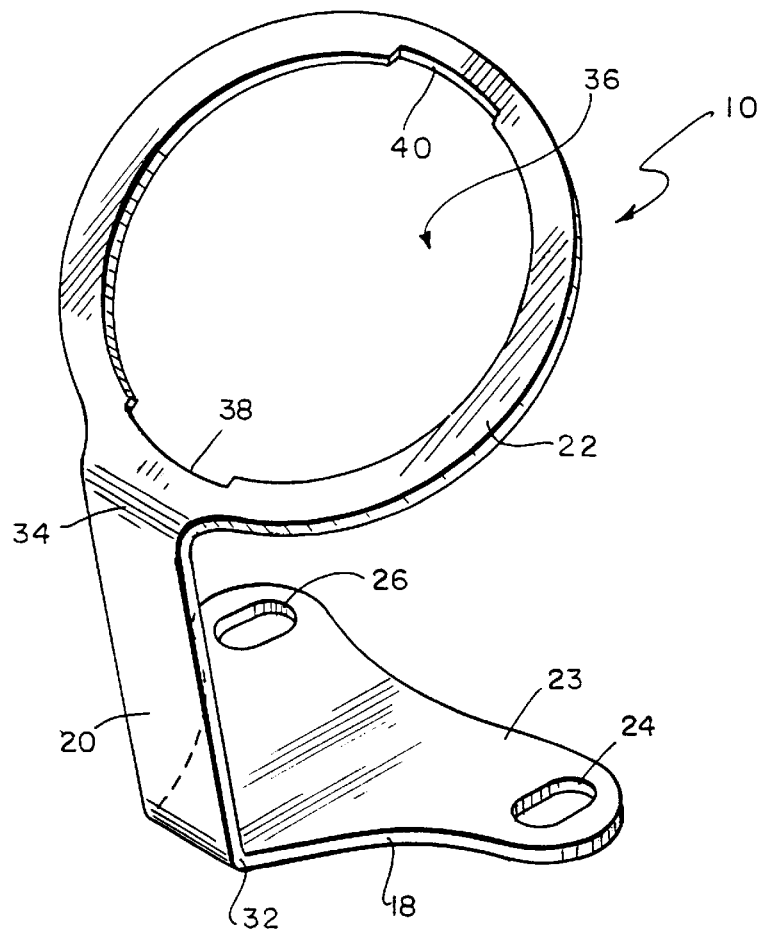
FIG. 1 is a perspective view of a preferred embodiment of a gauge mount showing the gauge mount having a springer fork-mounting portion configured to mount to a springer fork of a motorcycle, gauge-mounting portion configured to support a gauge, and neck extending between the springer fork-mounting portion and the gauge-mounting portion.

A gauge mount 10 for supporting a gauge 12 is shown in FIGS. 1–5. Gauge mount 10 is mounted on a springer fork 14 of a motorcycle 16. Gauge mount 10 and springer fork 14 comprise a springer fork assembly 11. Mounting gauge mount 10 on springer fork 14 permits gauge 12 to be positioned in an aesthetically pleasing location on motorcycle 16.

Figure 2:
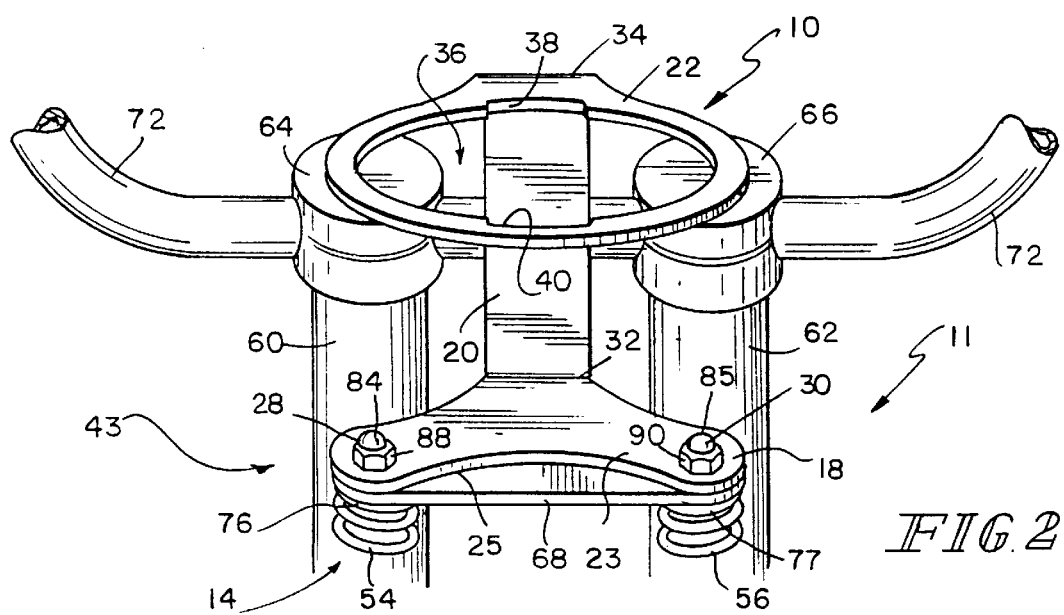
FIG. 2 is an enlarged front elevational view of the gauge mount of FIG. 1 mounted on a spring bridge of a springer fork of a motorcycle in a location positioned to lie between motorcycle handlebars.
Figure 3:
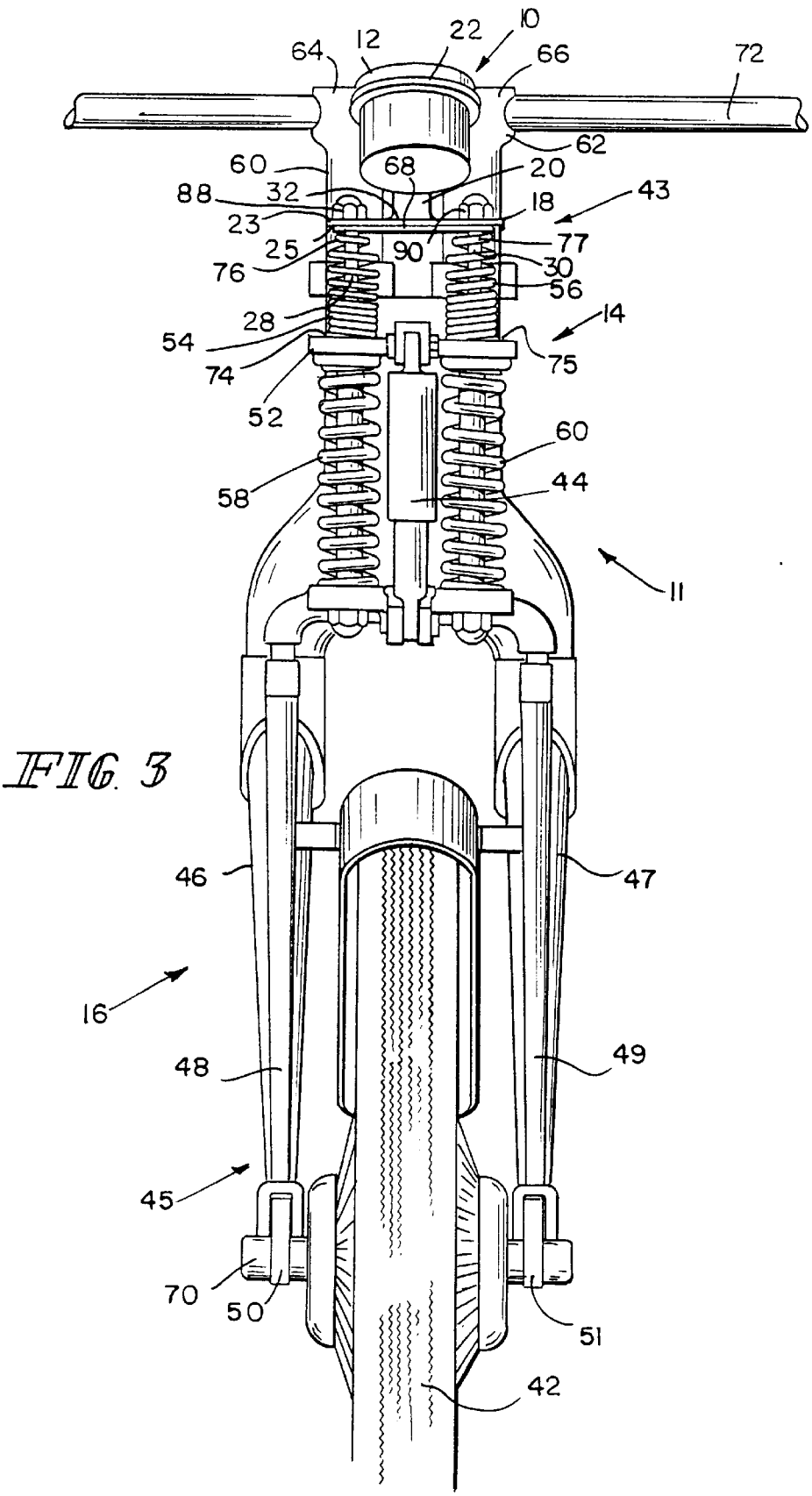
FIG. 3 is a front elevational view of the gauge mount of FIG. 1 mounted on the spinger fork, with a headlight removed for clarity, showing a gauge mounted in the gauge mount and the position of the gauge mount relative to components of the springer fork and motorcycle.

Gauge mount 10 includes a springer fork-mounting portion 18, a neck 20, and an annular gauge-mounting portion 22 as shown in FIGS. 1–5. Springer fork-mounting portion 18 is formed to include a top side 23 facing away from springer fork 14, a bottom side 25 facing toward springer fork 14, a neck support portion positioned to lie adjacent to neck 20, and spaced-apart first and second springer fork-mounting couplers connected to the neck support portion as shown in FIGS. 1–3. The first and second springer fork-mounting couplers are formed to include spaced-apart first and second rod-receiving apertures or springer fork-mounting apertures 24, 26 for receiving spaced-apart first and second springer fork rods 28, 30 as shown in FIGS. 1–3. Neck 20 includes a first end 32 appended to springer fork-mounting portion 18 and a second end 34 appended to gauge-mounting portion 22. In alternative embodiments of the present invention, the length of the neck may be different to compensate for different size gauges that may be situated within the gauge-mounting portion.

Gauge-mounting portion 22 is formed to include a gauge-receiving aperture 36 sized to receive gauge 12. In the illustrated embodiment, gauge-receiving aperture 36 is annular. However, in alternative embodiments of the present invention, the gauge-receiving aperture could be of any size and shape to receive any particular gauge. In the illustrated embodiment of the present invention, gauge-receiving aperture 36 is sized to receive a single gauge 12. In alternative embodiments of the present invention, the gauge-mounting portion can be sized and shaped to receive multiple gauges. Gauge-receiving aperture 36 is formed to include circumferentially spaced-apart first and second notches 38, 40 to assist in receiving and supporting gauge 12.

Springer fork 14 acts as a motorcycle-suspension system to dampen impacts felt by a motorcycle user, for example, when a front wheel 42 of motorcycle 16 drives over a bump, pothole, etc. More particularly, springer fork 14 assists a shock absorber 44 in dampening impacts felt by motorcycle users. Springer fork 14 includes a top portion 43 situated adjacent to U-shaped motorcycle handlebars 72 and a bottom portion 45 situated adjacent to front wheel 42 of motorcycle 16 as shown in FIGS. 2–5. Gauge mount 10 is mounted to top portion 43 of springer fork 14.

Springer fork 14 includes first and second rigid legs or rigid fork legs 46, 47, first and second links or rockers 50, 51, first and second handle bar risers 60, 62, first and second riser caps 64, 66, and first and second springer legs. The first and second springer legs include first and second spring fork legs 48, 49, spring brace 52, first and second rebound springs 54, 56, first and second compression springs 58, 59, spring bridge 68, and first and second springer fork rods 28, 30.

First rigid fork leg 46, first spring fork leg 48, first rocker 50, first rebound spring 54, first compression spring 58, first handle bar riser 60, and first riser cap 64 are identical to second rigid fork leg 47, second spring fork leg 49, second rocker 51, second compression spring 59, second rebound spring 56, second handle bar riser 62, and second riser cap 66 except that they are situated on opposite sides of front wheel 42 as shown in FIG. 3. As shown in FIGS. 2 and 3, gauge mount 10 is situated between identical first and second handle bar risers 60, 62 and connected to identical first and second rebound springs 54, 56.

First rocker 50 is connected to first rigid fork leg 46, first spring fork leg 48, and an axle 70 of front wheel 42 of motorcycle 16 as shown in FIGS. 3–5. Second rocker 51 is similarly connected to second rigid fork leg 47, second spring fork leg 49, and axle 70. First and second rockers 50, 51 act as levers or support rockers in the suspension process. During normal operating conditions, first and second rockers 50, 51 are situated in an at-rest suspension position as shown in FIGS. 3 and 4. When front wheel 42 of motorcycle 16 drives over a bump in the road, rocker 50 moves to an activated suspension position as shown in FIG. 5. When first and second rockers 50, 51 move from the at-rest suspension position to the activated suspension position, rigid fork legs 46, 47 do not move and thus act as fulcrums in the suspension process. First and second spring fork legs 48, 49 do move during the suspension process to transfer forces from the weight of motorcycle 16 as well as recoil action of first and second rockers 50, 51 to first and second compression springs 58, 59, respectively.

First and second compression springs 58, 59 create suspension resistance against the upward movement of first and second rockers 50, 51, respectively, and first and second spring fork legs 48, 49, respectively, due to the bearing weight of motorcycle 16 and forces created during the suspension process. First and second rebound springs 54, 56 counteract the effects of compression springs 58, 59, respectively, to create a neutral position or neutral attitude of first and second rockers 50, 51. During the suspension process when first and second rockers 50, 51 move from the at-rest suspension position, shown in FIGS. 3 and 4, to the activated suspension position, shown in FIG. 5, first and second compression springs 58, 59 and shock absorber 44 compress and first and second rebound springs 54, 56 extend in direction 73 as shown in FIG. 5. When springer fork 14 returns to its at-rest suspension position, first and compression springs 58, 59 and first and second rebound springs 54, 56 return to the position shown in FIGS. 3 and 4.

Spring brace 52 is connected to first and second rigid fork legs 46, 47. Spring brace 52 comprises a non-moving portion of the springer legs and first and second spring fork legs 48, 49, first and second rebound springs 54, 56, first and second compression springs 58, 59, spring bridge 68, and first and second springer fork rods 28, 30 comprise a moving portion of the springer legs. Spring brace 52 does not move during the suspension process and acts as a stop for first and second compression springs 58, 59 and first and second rebound springs 54, 56 to transfer forces created in the suspension process back to first and second rigid fork legs 46, 47.

First handle bar riser 60 connects first rigid fork leg 46 and handlebars 72 and second handle bar riser 62 connects second rigid fork leg 47 and handlebars 72 as shown in FIGS. 2–5. Gauge mount 10 is situated between first and second handle bar risers 60, 62 as shown in FIGS. 2 and 3.

Spring bridge 68 connects first and second rebound springs 54, 56 together as shown in FIGS. 2 and 3. First rebound spring 54 extends between a first end 74 situated adjacent to spring brace 52 and a second end 76 situated adjacent to spring bridge 68. Second rebound spring 56 similarly extends between a first end 75 situated adjacent to spring brace 52 and a second end 77 situated adjacent to spring bridge 68.

First and second springer fork rods 28, 30 extend longitudinally through first and second rebound springs 54, 56 as shown in FIGS. 2–5. In the illustrated embodiment, first springer fork rod 28 extends between a first end 82 connected to spring brace 52 and a second end 84 connected to springer fork-mounting portion 18 of gauge mount 10 and spring bridge 68. Second springer fork rod 30 similarly extends between a first end 83 connected to spring brace 52 and a second end 85 connected to springer fork-mounting portion 18 of gauge mount 10 and spring bridge 68. More specifically, second end 84 of first springer fork rod 28 extends through rod-receiving aperture 24 formed in springer fork-mounting portion 18 and second end 85 of second springer fork rod 30 extends through rod-receiving aperture 26 formed in springer fork-mounting portion 18.

Figure 10:
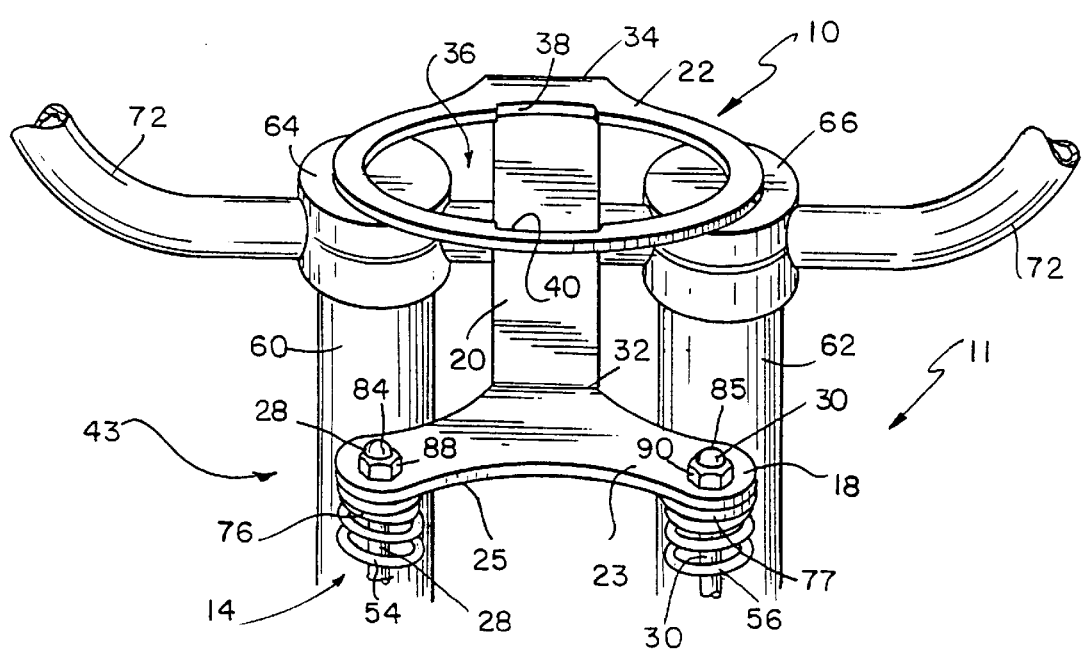
FIG. 10 is a front elevational view similar to FIG. 2 showing the gauge mount of FIG. 1 mounted on the springer fork with the spring bridge removed.

In the illustrated embodiment of the present invention, gauge mount 10 is connected to springer fork 14 by removing nuts 88, 90 and placing bottom side 25 of springer fork-mounting portion 18 on top of spring bridge 68 so that first and second springer fork rods 28, 30 extend through rod-receiving apertures 24, 26 formed in springer fork-mounting portion 18. In another preferred embodiment of the present invention, spring bridge 68 can be removed from springer fork 14 and bottom side 25 of springer fork-receiving portion 18 can be situated directly on second end 76, 77 of rebound springs 54, 56 as shown in FIG. 10. This embodiment would be preferred, for example, if the manufacturer of motorcycle 16 initially installed gauge mount 10 on motorcycle 16. Then spring bridge 68 would not even be needed, thus saving the cost of manufacturing spring bridge 68. In other preferred embodiments, the gauge mount may be mounted directly onto the spring bridge without any connection to the springer fork rods.

By mounting gauge mount 10 to springer fork 14, gauge mount 10 is able to move with springer fork 14 as it moves between its at-rest suspension position, shown in FIGS. 3 and 4, and its activated suspension position shown in FIG. 5. Gauge 12 is able to be mounted in an aesthetically pleasing location because the movement of springer fork 14 does not dictate the location of gauge mount 10 and gauge 12. In addition, gauge mount 10 and gauge 12 cannot be damaged by movement of springer fork 14 because they are mounted to move with springer fork 14.

A gauge mount 110 according to a second preferred embodiment of the present invention is shown in FIGS. 6 and 7. Gauge mount 110 includes a springer fork-mounting portion 112, neck 114, and gauge-mounting portion 116. Neck 114 includes a first neck section 118 appended to springer fork-mounting portion 112 and a second neck section 120 appended to gauge-mounting portion 116. Second neck section 120 is movable relative to first neck section 118 so that a distance 122 between springer fork-mounting portion 112 and gauge-mounting portion 116 may be changed. In addition, a hinge connection 124 is provided between second neck section 120 and gauge-mounting portion 116 so that gauge-mounting portion 116 may be rotated about a hinge axis of rotation 126 relative to neck 114 and springer fork-mounting portion 112 as shown in FIG. 7.

First neck section 118 is formed to include a slot 128, first side 130 facing toward second neck section 120, and second side 132 facing away from second neck section 120. Second neck section 120 is formed to include a slot 134, a first side 136 facing toward first neck section 118, and a second side 138 facing away from first neck section 118. An adjustment bolt 140 extends through slots 128, 134 to fix the position of second neck section 120 relative to first neck section 118 as shown in FIG. 7. A nut 170 and first and second washers 172, 174 are connected to adjustment bolt 140.

First side 130 of first neck section 118 and first side 136 of second neck section 120 are formed to include a serrated surface 142, 143, respectively, to assist adjustable bolt 140 in securing the position of second neck section 120 relative to first neck section 118. To change the distance 122 between springer fork-mounting portion 112 and gauge-mounting portion 116, adjustable bolt 140 is loosened and serrated surfaces 142, 143 of first and second neck sections 118, 120 are separated so that second neck section 120 may be moved relative to first neck section 118 to a desired location. Once the desired distance 122 between springer fork-mounting portion 112 and gauge-mounting portion 116 is achieved, adjustable bolt 140 is tightened by a user so that serrated surfaces 142, 143 of first and second neck sections 118, 120 engage each other to prevent first and second neck sections 118, 120 from moving relative to each another.

Hinge connection 124 includes a cylindrical portion 144 on second neck section 120 and spaced-apart first and second ears 146, 148 on gauge-mounting portion 116 as shown in FIGS. 6 and 7. Cylindrical portion 144 includes a first end 176 and a second end 178. Spaced-apart first and second ears 146, 148 are situated adjacent to first and second ends 176, 178, respectively, of cylindrical portion 144. Hinge apertures 150, 152, 154 are formed in cylindrical portion 144 and first and second ears 146, 148, respectively, along hinge axis of rotation 126. A hinge adjustment bolt 155 extends through hinge apertures 150, 152, 154. A nut 180 and first and second washers 182, 184 are connected to hinge adjustment bolt 155.

Gauge-mounting portion 116 may be rotated about hinge axis of rotation 126 by manually loosening hinge adjustment bolt 155. A user may then rotate gauge-mounting portion 116 in direction 166 or direction 168 until the desired position of gauge-mounting portion 116 is achieved as shown in FIG. 7. Once the desired position of gauge-mounting portion 116 is achieved, hinge adjustment bolt 155 may then be manually tightened to fix the position of gauge-mounting portion 116 relative to neck 114 and springer fork-mounting portion 112.

In alternative embodiments of the present invention, the gauge mount may include first and second neck sections that are adjustable relative to each other without a hinge connection between the neck and gauge-mounting portion. Also, in alternative embodiments, the gauge mount may include a hinge connection between the neck and gauge-mounting portion without first and second neck sections that are adjustable relative to each other.

Gauge mounting-portion 116 is formed to include a gauge-receiving aperture 156 and first and second notches 158, 160 that are identical to gauge-receiving aperture 36 and first and second notches 38, 40 formed in gauge-mounting portion 22 of gauge mount 10 shown in FIGS. 1 and 2. Springer fork-mounting portion 112 is formed to include first and second rod-receiving apertures 162, 164 that are identical to first and second rod-receiving apertures 24, 26 formed in springer fork-mounting portion 18 of gauge mount 10 shown in FIG. 1. Gauge mount 110 connects to springer fork 14 in the same manner as gauge mount 10.

A gauge mount 210 according to a third preferred embodiment of the present invention is shown in FIGS. 8 and 9. Gauge mount 210 includes a springer fork-mounting portion 212, neck 214, and gauge-mounting portion 216. Neck 214 includes a first neck section 218 appended to springer fork-mounting portion 212 and a second neck section 220 appended to gauge-mounting portion 216. Gauge mount 210 further includes a suspension system 222 that dampens impacts felt by gauge 12, for example, when motorcycle 16 drives over a bump or pothole in a road.

Gauges 12 and other equipment mounted on motorcycle 16 are subjected to impacts, for example, when motorcycle 16 drives over bumps or potholes in a road. Many gauges 12 are sensitive to these impacts. Often, a gauge 12 that is subjected to an impact begins to perform unsatisfactorily.

Suspension system 222 of gauge mount 210 reduces the impact felt by gauge mount 210 so that gauge mount 210 performs satisfactorily. Suspension system 222 includes first and second springs 224, 226, spaced-apart first and second spring guide bars 228, 230, spaced-apart first and second spring guide bar plates 232, 234, and first and second tongues 236, 238 as shown in FIGS. 8 and 9. First and second spring guide bars 228, 230 each extend upwardly from a first end 240 appended to springer fork-mounting portion 212 toward gauge-mounting portion 216 to a second end 242 spaced apart from first end 240. Nuts 262, 264 are connected to spring guide bars 228, 230, respectively. First and second spring guide bar plates 232, 234 are appended to second neck section 220 and are formed to include spring guide bar-receiving apertures 244, 246, 248, 250, shown in FIGS. 8 and 9, for receiving spring guide bars 228, 230.

First spring guide bar 228 extends through first spring 224, spring guide bar-receiving aperture 244 formed in first spring guide bar plate 232, and spring guide bar-receiving aperture 248 formed in second spring guide bar plate 234. Second spring guide bar 230 extends through second spring 226, spring guide bar-receiving aperture 246 formed in first spring guide bar plate 232, and spring guide bar-receiving aperture 250 formed in second spring guide bar plate 234.

First and second springs 224, 226 are situated between springer fork-mounting portion 212 and first spring guide bar plate 232 as shown in FIGS. 8 and 9. When gauge mount 210 and gauge 12 (shown in phantom in FIG. 9) are in the at-rest position, first and second springs 224, 226 are in their at-rest positions and gauge-mounting portion 216 is situated in the position indicated by phantom lines in FIG. 9. When gauge mount 210 is subjected to an impact, first and second springs 224, 226 compress and first neck section 218 and gauge-mounting portion 216 move downwardly toward springer fork-mounting portion 212 relative to second neck section 220 and springer fork-mounting portion 212 to dampen the impact felt by gauge 12. The position of gauge-mounting portion 216 and first neck section 218 when gauge mount 210 experiences an impact is shown in solid lines in FIG. 9.

First and second springs 224, 226 have a stiffness such that they do not compress due to the weight of gauge 12, gauge-mounting portion 216, and second neck section 220 alone. First and second springs 224, 226 compress only when an impact is experienced by gauge mount 210.

First and second tongues 236, 238 are appended to first neck section 218 and extend outwardly to engage second neck section 220 as shown in FIGS. 8 and 9. The connection between second neck section 220 and first and second tongues 236, 238 and the connection between first and second spring guide bars 228, 230 and first and second spring guide bar plates 232, 234, respectively, guide first neck section 218 as it moves relative to second neck section 220. In alternative embodiments of the present invention, other means may be used to guide first neck section relative to second neck section.

Gauge mounting-portion 216 is formed to include a gauge-receiving aperture 252 and first and second notches 254, 256 that are identical to gauge-receiving aperture 36 and first and second notches 38, 40 formed in gauge-mounting portion 22 of gauge mount 10, shown in FIGS. 1 and 2, and gauge-receiving aperture 156 and first and second notches 158, 160 formed in gauge-mounting portion 116 of gauge mount 110 shown in FIGS. 6 and 7. Springer fork-mounting portion 212 is formed to include first and second rod-receiving apertures 258, 260 that are identical to first and second rod-receiving apertures 24, 26 formed in springer fork-mounting portion 18 of gauge mount 10, shown in FIG. 1, and first and second rod-receiving apertures 162, 164 formed in springer fork-mounting portion 112 of gauge mount 110 shown in FIG. 6. Gauge mount 210 connects to springer fork 14 in the same manner as gauge mounts 10, 110.

Although this invention has been described in detail with reference to certain preferred embodiments, variations and modifications exist within the scope and spirit of the invention as described and as defined in the following claims.

I claim:

1. A springer fork for use on a motorcycle having handlebars, the springer fork comprising
    a springer leg and
    a gauge mount including a springer fork-mounting portion coupled to the springer leg for movement relative to the handlebars and a gauge-mounting portion configured to support a gauge, the gauge mount further including a neck extending between a first end appended to the springer fork-mounting portion and a second end appended to the gauge-mounting portion and a hinge connection between the second end of the neck and the gauge-mounting portion.

2. The springer fork of claim 1, wherein the springer leg includes a top portion situated adjacent the handlebars of a motorcycle, and the gauge mount is mounted to the top portion of the springer leg.

3. The springer fork of claim 1, wherein the springer leg includes a non-moving portion that does not move relative to the handlebars and a moving portion that moves relative to the handlebars, and the gauge mount is coupled to the moving portion of the springer leg for movement relative to the handlebars.

4. The springer fork of claim 3, further comprising a rigid fork leg, the non-moving portion of the springer leg including a spring brace coupled to the rigid leg, the moving portion of the springer leg including a spring fork leg coupled to the wheel and a springer fork rod coupled to the spring fork leg, the springer fork rod having a top end spaced apart from the spring brace, and the gauge mount being coupled to the top end of the springer fork rod.

5. A springer fork for use on a motorcycle having handlebars, the springer fork comprising
    a springer leg having a non-moving portion that does not move relative to the handlebars and a moving portion that moves relative to the handlebars and a gauge mount coupled to the moving portion of the springer leg for movement relative to the handlebars.

6. The springer fork of claim 5, wherein the gauge mount includes a springer fork-mounting portion coupled to the moving portion of the springer leg and a gauge-mounting portion configured to support a gauge.

7. The springer fork of claim 6, wherein the gauge mount further includes a first neck section appended to the springer fork-mounting portion and a second neck section appended to the gauge-mounting portion and configured to move relative to the first neck section.

8. The springer fork of claim 6, wherein the gauge mount further includes a neck extending between a first end appended to the springer fork-mounting portion and a second end appended to the gauge-mounting portion and a hinge connection between the second end of the neck and the gauge-mounting portion.

9. The springer fork of claim 8, wherein the hinge connection includes a cylindrical portion on the first end of the neck, the cylindrical portion having a first end and a second end, spaced-apart first and second ears connected to one of the gauge-mounting portion and springer fork-mounting portion and situated adjacent to the first and second ends of the cylindrical portion, respectively, and a hinge adjustment bolt extending through apertures formed in the cylindrical portion and first and second ears.

10. The springer fork of claim 6, wherein the gauge mount further includes a suspension system having a spring configured to bias the gauge-mounting portion relative to the springer fork-mounting portion.

11. The springer fork of claim 10, wherein the gauge mount further includes a neck having a first end appended to the springer fork-mounting portion and a second end appended to the gauge-mounting portion and the spring extends between the springer-fork mounting portion and the neck.

12. The springer fork of claim 10, wherein the gauge mount further includes a first neck section appended to the springer fork-mounting portion and a second neck section appended to the gauge-mounting portion and the spring extends between the springer fork-mounting portion and the second neck section.

13. The springer fork of claim 10, wherein the suspension system includes a spring guide bar having a first end appended to the springer fork-mounting portion and configured to extend upwardly toward the gauge-mounting portion to a second end spaced apart from the first end and the spring guide bar extends through the spring.

14. The springer fork of claim 13, wherein the second neck section includes a spring guide bar plate formed to include a spring guide bar-receiving aperture through which the spring guide bar extends and the spring includes a first end situated adjacent to the springer fork-mounting portion and a second end situated adjacent to the spring guide bar plate.

15. The springer fork of claim 10, wherein the second neck section is formed to include spaced-apart first and second tongues configured to engage the first neck section and guide the second neck section as the second neck section moves relative to the first neck section.

16. The springer fork of claim 6, further comprising a neck extending between a first end and a second end, the first end of the neck being appended to the springer fork-mounting portion and the second end of the neck being appended to the gauge-mounting portion.

17. The springer fork of claim 5, wherein the springer leg includes a top portion situated adjacent a handlebar of a motorcycle and the gauge mount is mounted to the top portion of the springer leg.

18. The springer fork of claim 6, wherein the springer fork-mounting portion includes spaced-apart first and second springer fork-mounting couplers.

19. The springer fork of claim 18, wherein the springer fork-mounting portion is formed to include a first aperture in the first springer fork-mounting coupler and a second aperture in the second springer fork-mounting coupler.

20. The springer fork of claim 5, further comprising a rigid leg, the non-moving portion of the springer leg including a spring brace coupled to the rigid leg, the moving portion of the springer leg including a spring fork leg and a springer fork rod having a top end spaced apart from the spring brace, and the gauge mount being coupled to the top end of the springer fork rod.

21. A springer fork for use on a motorcycle having handlebars and a wheel, the springer fork comprising
a springer leg having a bottom end adapted to couple to a wheel and a top end spaced-apart from the bottom end and
a gauge mount coupled to the top end of the springer leg to permit the gauge mount to move relative to the handlebars.

22. The springer fork of claim 21, wherein the gauge mount includes a springer fork-mounting portion adapted to couple to the top end of the springer fork rod, a gauge-mounting portion adapted to support a gauge, a first neck section appended to the springer fork-mounting portion, and a second neck section appended to the gauge-mounting portion and configured to move relative to the first neck section.

23. The springer fork of claim 21, wherein the springer leg includes a spring fork leg adapted to couple to a wheel and a springer fork rod coupled to the spring fork leg and having a top end spaced apart from the wheel and the gauge mount includes a springer fork-mounting portion adapted to couple to the top end of the springer fork rod, a gauge-mounting portion adapted to support a gauge, a neck extending between a first end appended to the springer fork-mounting portion, and a second end appended to the gauge-mounting portion, and a hinge connection between the second end of the neck and the gauge-mounting portion.

24. The springer fork of claim 23, wherein the hinge connection includes a cylindrical portion on the first end of the neck, the cylindrical portion having a first end and a second end, spaced-apart first and second ears situated adjacent to the first and second ends of the cylindrical portion, respectively, and a hinge adjustment bolt extending through apertures formed in the cylindrical portion and first and second ears.

25. The springer fork of claim 23, wherein the springer fork-mounting portion includes a neck support portion connected to he first end of the neck and spaced-apart first and second couplers connected to the neck support portion.

26. The springer fork of claim 21, wherein the gauge mount includes a springer fork-mounting portion adapted to couple to the top end of the springer leg, a gauge-mounting portion adapted to support a gauge, and a suspension system having a spring configured to bias the gauge-mounting portion relative to the springer fork-mounting portion.

27. The springer fork of claim 26, wherein the gauge mount further includes a neck having a first end appended to the springer fork-mounting portion and a second end appended to the gauge-mounting portion and the spring extends between the springer-fork mounting portion and the neck.

28. The springer fork of claim 26, wherein the gauge mount further includes a first neck section appended to the springer fork-mounting portion and a second neck section appended to the gauge-mounting portion and the spring extends between the springer fork-mounting portion and the second neck section.

29. The springer fork of claim 26, wherein the suspension system includes a spring guide bar having a first end appended to the springer fork-mounting portion and configured to extend upwardly toward the gauge-mounting portion to a second end spaced apart from the first end and the spring guide bar extends through the spring.

30. The springer fork of claim 29, wherein the second neck section includes a spring guide bar plate formed to include a spring guide bar-receiving aperture through which the spring guide bar extends and the spring includes a first end situated adjacent to the springer fork-mounting portion and a second end situated adjacent to the spring guide bar plate.

31. The springer fork of claim 21, wherein the gauge mount includes a springer fork-mounting portion adapted to couple to the top end of the springer leg, a gauge mounting portion adapted to support a gauge, and a neck extending between a first end and a second end, the first end of the neck is appended to the springer fork-mounting portion, and the second end of the neck is appended to the gauge-mounting portion.

32. The springer fork of claim 21, wherein the gauge mount includes a springer fork-mounting portion adapted to couple to the top end of the springer leg, a gauge-mounting portion adapted to support a gauge and the springer fork-mounting portion includes a neck support portion and spaced-apart first and second couplers connected to the neck support portion.

33. The springer fork of claim 32, wherein a first aperture is formed in the first coupler and a second aperture is formed in the second coupler.

34. The springer fork of claim 32, further comprising a neck extending between the neck support portion of the springer fork-mounting portion and the gauge-mounting portion.

35. The springer fork of claim 21, further comprising a rigid leg, the springer leg including a spring brace coupled to the rigid leg, a spring fork leg adapted to couple to the wheel, and a springer fork rod coupled to the spring fork leg, the motorcycle further including handlebars, the spring brace comprising a non-moving portion of the springer leg that does not move relative to the handlebars, the springer fork rod and spring fork leg comprising a moving portion of the springer leg, and the gauge mount being coupled to the moving portion of the springer leg so that the gauge mount moves relative to the handlebars.

36. A springer fork for use on a motorcycle having a wheel and handlebars, the springer fork comprising
a rigid leg,
a link coupled to the rigid leg and adapted to couple to the wheel,
a springer leg coupled to the link, the springer leg having a non-moving portion that does not move relative to the handlebars and a moving portion that moves relative to the handlebars, and
a gauge mount coupled to the moving portion of the springer leg for movement relative to the handlebars.

37. The springer fork of claim 36, wherein the gauge mount includes a springer fork-mounting portion coupled to the moving portion of the springer leg, a gauge-mounting portion configured to support a gauge, a first neck section appended to the springer fork-mounting portion, and a second neck section appended to the gauge-mounting portion and configured to move relative to the first neck section.

38. The springer fork of claim 36, wherein the gauge mount includes a springer fork-mounting portion coupled to the moving portion of the springer leg, a gauge-mounting portion configured to support a gauge, and a suspension system having a spring configured to bias the gauge-mounting portion relative to the springer fork-mounting portion.

39. The springer fork of claim 36, wherein the springer leg includes a top portion situated adjacent to the handlebars of a motorcycle and the gauge mount is mounted to the top potion of the springer leg.

40. The springer fork of claim 36, further comprising a rigid leg, the non-moving portion of the springer leg including a spring brace coupled to the rigid leg, the moving portion of the springer leg including a spring fork leg and a springer fork rod coupled to the spring fork leg and having a top end spaced apart from the spring brace, and the gauge mount is coupled to the top end of the springer fork rod.

41. A springer fork for use on a motorcycle including handlebars and a wheel having an axle, the springer fork comprising
a rigid leg,
a link coupled to the rigid leg and adapted to couple to a wheel,
a springer leg coupled to the link, the springer leg having a bottom end adapted to lie adjacent to the axle of the wheel and a top end spaced apart from the bottom end, and
a gauge mount coupled to the top end of the springer leg to permit the gauge mount to move relative to the handlebars.

42. The springer fork of claim 41, wherein the springer leg includes a non-moving portion that does not move relative to the handlebars and a moving portion that moves relative to the handlebars and the gauge mount includes a springer fork-mounting portion coupled to the moving portion of the springer leg, a gauge-mounting portion configured to support a gauge, a first neck section appended to the springer fork-mounting portion, and a second neck section appended to the gauge-mounting portion and configured to move relative to the first neck section.

43. The springer fork of claim 41, wherein the springer leg includes a non-moving portion that does not move relative to the handlebars and a moving portion that moves relative to the handlebars and the gauge mount includes a springer fork-mounting portion coupled to the moving portion of the springer leg, a gauge-mounting portion configured to support a gauge, and a suspension system having a spring configured to bias the gauge-mounting portion relative to the springer fork-mounting portion.

44. The springer fork of claim 41, further comprising a rigid leg, the springer leg including a spring brace coupled to the rigid leg, a spring fork leg adapted to couple to the wheel, and a springer fork rod coupled to the spring fork leg, the spring brace comprising a non-moving portion of the springer leg that does not move relative to the handlebars, the springer fork rod and spring fork leg comprising a moving portion of the springer leg, and the gauge mount being coupled to the moving portion of the springer leg so that the gauge mount moves relative to the handlebars.

45. A springer fork for use on a motorcycle having a wheel and having handlebars, the springer fork comprising
a rigid leg a link coupled to the rigid leg and adapted to couple to the wheel, a springer leg, and a gauge mount including a springer fork-mounting portion coupled to the springer leg for movement relative to the handlebars and a gauge-mounting portion configured to support a gauge, the gauge mount further including a neck extending between a first end appended to the springer fork-mounting portion and a second end appended to the gauge-mounting portion and a hinge connection between the second end of the neck and the gauge-mounting portion.

46. The springer fork of claim 45, wherein the springer leg includes a top portion situated adjacent the handlebars of a motorcycle, and the gauge mount is mounted to the top portion of the springer leg.

47. The springer fork of claim 46, further comprising a rigid leg, the springer leg including a non-moving portion that does not move relative to the handlebars and a moving portion that moves relative to the handlebars, the non-moving portion of the springer leg including a spring brace coupled to the rigid leg, the moving portion of the springer leg including a spring fork leg and a springer fork rod coupled to the spring fork leg and having a top end spaced apart from the spring brace, and the gauge mount being coupled to the top end of the springer fork rod.

\* \* \* \* \*